UNITED STATES PATENT OFFICE.

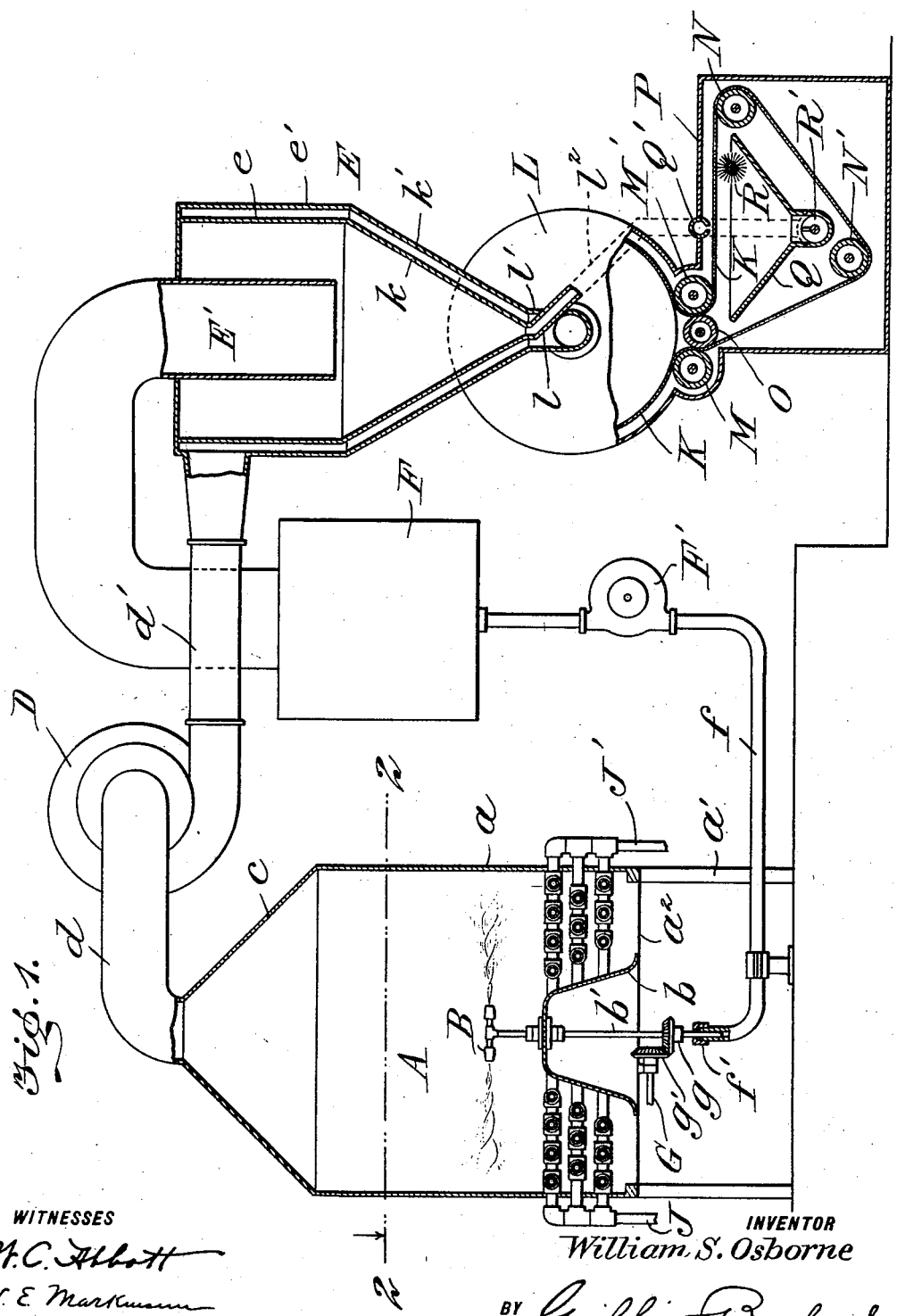

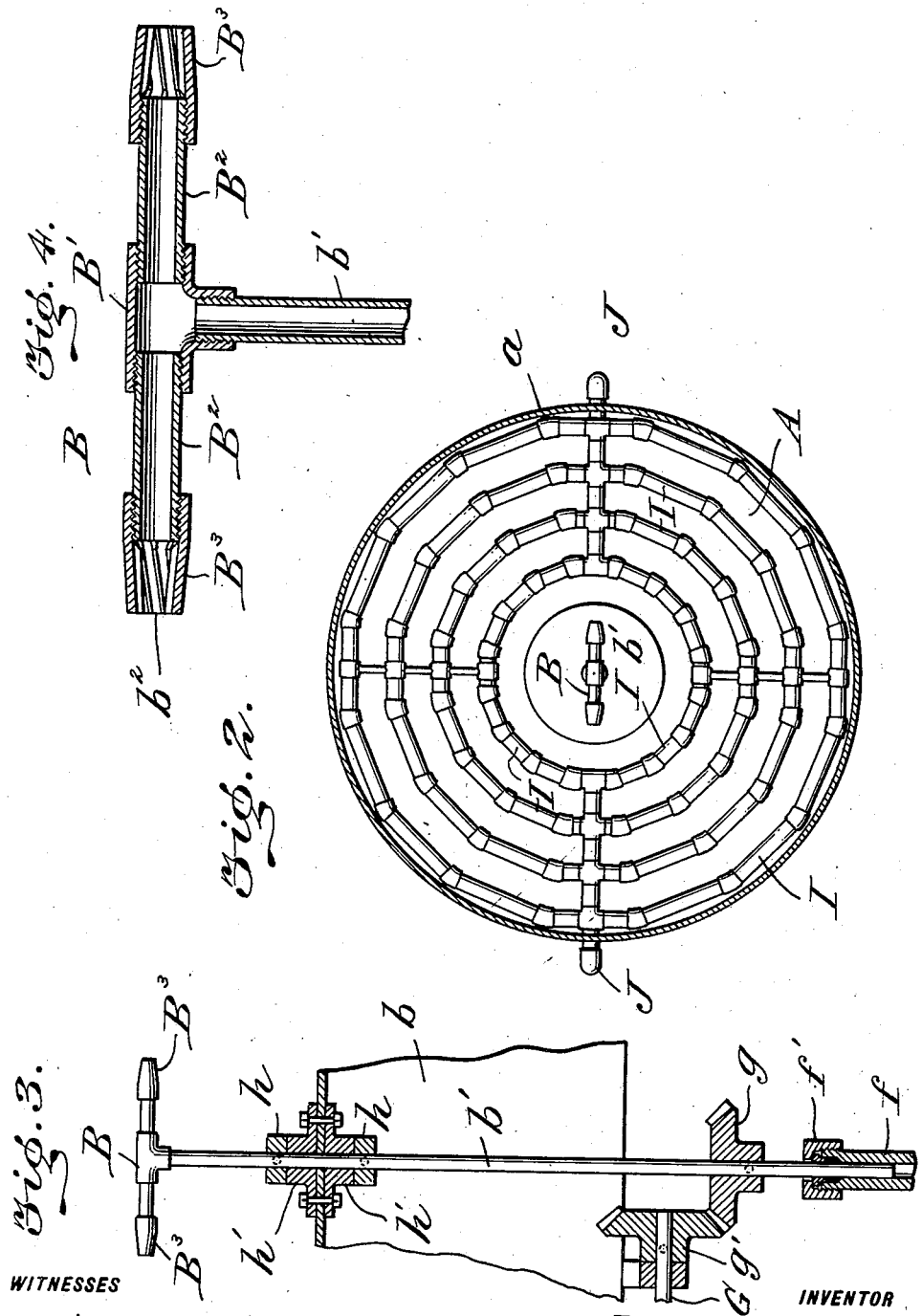

WILLIAM S. OSBORNE, OF NEW YORK, N. Y., ASSIGNOR, BY DIRECT AND MESNE ASSIGNMENTS, TO OSBORNE DESICCATING MACHINERY COMPANY, A CORPORATION OF NEW YORK.

APPARATUS FOR DESICCATING AND COLLECTING SOLIDS FROM FLUID SUBSTANCES.

1,007,381.     Specification of Letters Patent.     Patented Oct. 31, 1911.

Application filed August 24, 1908. Serial No. 450,105.

*To all whom it may concern:*

Be it known that I, WILLIAM S. OSBORNE, a citizen of the United States, residing in the city of New York, borough of Manhattan, county and State of New York, have invented a certain new and useful Apparatus for Desiccating and Collecting Solids from Fluid Substances, of which the following is a specification.

This invention appertains to the art of desiccating and collecting solids from fluid substances of various natures and kinds, such as milk or milk products, blood, and the like.

According to this invention, the substance to be treated is changed from a state of liquid to a finely divided condition by novel appliances, and while such substance is suspended in a finely divided mechanical state, it is treated by exposure to a current of air which acts in a manner to thoroughly desiccate the substance while at the same time conveying it to other machinery wherein the desiccated product is separated from the air and collected in appropriate receivers with practically no loss of the product.

Prior to this invention it has been proposed to desiccate fluid substances by atomizing the same into a chamber through which air is adapted to circulate, and to subsequently separate the solid particles from the dust and air. In such prior methods of treatment, however, the atomizing and desiccating operations were carried on under such conditions that the finely divided liquid subsequent to atomization were brought into such proximity to each other that a certain percentage of such atoms were free to re-unite, thus resulting in a free liquid which must either be returned to the apparatus and again atomized or be lost in the process.

The main purposes of this invention are two-fold, first, to distribute the liquid in a closed chamber and under such conditions that the finely divided liquid cannot reunite, and to supply atmospheric air, preferably heated to the required temperature, in such volumes directly to the zone of sprayed liquid under treatment as to carry off the liquid from the zone of distribution as fast as it is delivered into said chamber. The effect of these operations is to practically envelop each particle of liquid under treatment by air, which not only precludes reunion of the finely divided liquid, but tends to thoroughly desiccate the same, for the reason that the air, particularly when heated, will absorb the moisture from the liquid particle, resulting in a substantially impalpable powder.

In the accompanying drawings I have illustrated one practical embodiment of the invention, but the construction shown therein is to be understood as illustrative, only, and not as defining the limits of the invention.

Figure 1 illustrates diagrammatically a complete apparatus embodying the present invention, the desiccating chamber and liquid spray devices being illustrated in vertical section, and the collecting and separating devices being shown, also, in vertical section. Fig. 2 is a horizontal sectional plan view on the line 2—2 of Fig. 1 through the desiccating element of the apparatus. Fig. 3 is a view in vertical section, partly in elevation, showing the spray devices which operate within the desiccating chamber, and Fig. 4 is a vertical section on an enlarged scale through the sprayer.

A casing, $a$, forms a desiccating chamber, A, within which the liquid material to be treated is sprayed by a suitable form of spraying mechanism, preferably a rotary sprayer, B, illustrated more clearly in Figs. 3 and 4 of the drawings. Casing, $a$, is supported in a raised position on a suitable stand or frame, $a'$, and the bottom of said casing is open at $a^2$ for the free ingress of air into chamber, A. Extending upwardly within chamber, A, is a dome, $b$, through which passes a supply pipe, $b'$, adapted to feed the liquid material to sprayer, B, as will presently appear. A tapering or conical top, $c$, substantially closes the upper part of casing, $a$, and to this top is connected one branch, $d$, of a wind trunk, the other branch, $d'$, of which connects with an exterior casing, $e$, of the pneumatic separating and dust collecting apparatus, E. Intermediate the branches, $d$, $d'$, of said wind trunk is a fan or blower, D, the same being of any suitable construction and operated by any suitable means, whereby a draft of air is caused to circulate through desiccating chamber, A, for the purpose of carrying with it the desiccated material, and such blast is delivered into the separating and collecting apparatus, E.

The material to be treated is contained within a tank, F, the same being supported preferably in a position raised above the horizontal plane of the sprayer, B, although said tank may be located at any other convenient place, in which event the liquid material may be forced by a pump to the spraying device. As shown, supply tank, F, is connected by a pipe, *f*, with feed pipe, *b′*, of the sprayer, and in said pipe, *f*, is interposed a pumping mechanism, F′, herein shown as a rotary pump, although any other type pump may be employed, whereby the liquid material may be forced under pressure to the sprayer.

Feed pipe, *b′*, is coupled rigidly to the sprayer head for rotation therewith, and, as shown in Figs. 1 and 3, the lower part of the rotatable feed pipe extends within an end portion of supply pipe, *f*, a suitable stuffing box, *f′*, being provided at the point where pipes, *b′*, *f*, meet each other to preclude leakage of liquid material at such point.

The sprayer head comprises a coupling, B′, a plurality of substantially radial arms, $B^2$, and nozzles, $B^3$, at the ends of said arms, but it will be understood that any other form of rotary sprayer may be employed in lieu of the particular sprayer illustrated in Fig. 4. Each nozzle, $B^3$, is provided interiorly with spiral ribs or grooves, $b^2$ (see Fig. 4), and when liquid is forced under pressure through pipes, *f*, *b′*, by the operation of pump, F′, the liquid is broken into a spray by ribs or grooves, $b^2$, of nozzles, $B^3$, sprayer, B, being rotated at the required speed. Said sprayer may be rotated in a horizontal plane by the pressure of liquid flowing through its nozzles, $B^3$, but in Figs. 1 and 3, I have illustrated means for positively driving said sprayer. As shown, feed tube, *b′*, is provided with a bevel gear, *g*, with which meshes a complemental gear, *g′*, on a driving shaft, G, the latter being propelled by any suitable means. It is evident that the shaft, G, and the gearing, *g*, *g′*, will rotate pipe, *b′*, and sprayer, B.

Pipe, *b′*, extends through the closed upper part of dome, *b*, which extends upwardly from the lower part of bottomless casing, *a*, and said pipe is supported by any suitable means in the dome, *b*, as for example, by collars, *h*, which are made fast with said pipe, *b′*, said collars engaging with bearing blocks, *h′*, fastened to the dome, *b*. It is evident, however, that the details of the means for supporting pipe, *b′*, and sprayer, B, may be modified by a skilled constructor.

Rotary sprayer, B, is supported within desiccating chamber, A, directly over dome, *b*, and said sprayer is adapted to rotate in a horizontal plane for the purpose of discharging the liquid spray in a substantially radial direction and in a practically continuous manner within chamber, A, and into the path of an upwardly moving current of air, the latter being induced to circulate through chamber, A, by the action of blower or fan, D. The diameter of sprayer, B, is much less than the internal diameter of desiccating chamber, A, whereby the liquid material may be sprayed and distributed in a substantially horizontal plane without coming in contact with the internal surfaces or walls of casing, *a*.

The manner of distributing and spraying the liquid material, and of supplying a large volume of air to the zone of distribution constitutes an important feature of this invention, for the reasons, first, that the particles of liquid material are separated from each other and enveloped by the inflowing air so as to preclude the possibility of the liquid particles re-uniting with each other; second, the sprayed liquid is instantly and continuously carried off from the zone of liquid distribution by the inflowing current of air, thus further precluding the re-union of the liquid particles, and, third, the particles of liquid material which are suspended mechanically and in a finely divided state in the air are desiccated and dried by the action of the air thereon, particularly when air is heated to a certain temperature.

Any suitable means may be employed for heating the air prior to, or at the time of, its admission into the desiccating chamber, and in Figs. 1 and 2 there is illustrated a practical form of air heating apparatus. As shown, the space between casing, *a*, at the lower part thereof, and dome, *b*, is substantially filled by heating coils or pipes arranged in rows, as indicated at I, said rows of pipes being slightly separated and disposed in staggered order so that the inflowing air will impinge the device and absorb heat therefrom, whereby the air as it passes upwardly into desiccating chamber, A, will be heated to a temperature proper for absorbing the moisture from the sprayed liquid material. Pipes, I, of the heater extend continuously around the wall of casing, *a*, and these annular pipes are practically nested one within the other as shown in Fig. 2, and they are staggered as shown in Fig. 1, in order that the air may pursue a tortuous course through the heater. A suitable heating medium, such as live steam, is adapted to be supplied to the pipes or coils, I, of heater by pipe, J, connected to one side of the coils, and to the other side of said coils or pipes there is connected an off bearing pipe, J′, adapted to carry away the exhaust steam and water of condensation.

The separating and collecting apparatus indicated generally by the reference character, E, in Fig. 1 is constructed substantially as disclosed in a prior application filed July 10, 1908, Serial No. 442,874, entitled "Pneumatic separating apparatus." As shown, the branch, $d'$, of the wind trunk is adapted to deliver the current of air laden with the material to be separated tangentially into the casing, $e$, whereby a whirling motion is imparted to the current for causing it to act in a manner familiar with dust collectors and securing a separation of the solid elements from the air. Casing, E, is surrounded by an outer jacket, $e'$, and said casing and the jacket are provided with substantially conical bottoms, $k$, $k'$, respectively, which terminate in concentric discharge outlets, $l, l'$. Casing, $e$, should be provided with suitable openings (not shown) whereby the solid matter separated from the air will pass into jacket, $e'$, and to adapt the apparatus for operation on different substances, these openings in casing, $e$, may be closed more or less by appropriate shutters, substantially as disclosed in the apparatus of my other application.

From the centrifugal separator a portion of the material passes directly to a filtering apparatus by which desiccated matter is completely separated from the air. Said filtering apparatus comprises an endless belt, K, composed of filtering material. The outlet, $l$, from the centrifugal separator is adapted to discharge by a pipe through one end of the casing, L, the latter containing a shaft and substantially circular heads, upon which heads the filtering fabric, K, is mounted. Said fabric is distended into a generally cylindrical form and it is positioned in such relation to casing, L, and outlet, $l$, that the material from the separator will be delivered within the substantially circular portion of the filtering fabric.

To remove the desiccated material from the chamber, L, and to keep the interstices of the fabric free and open, means are employed for continuously moving the filtering fabric into and from said chamber and cleaning said fabric without interrupting the filtering operation. Rolls, M, M', are journaled in the lower part of casing, L, so as to bear closely against the outer surfaces of the filtering fabric, K, and between said rolls is a third roll, O, the group of three rolls being so arranged that the fabric passes upward between rolls, M, O, being closely pressed between them, and after clearing the heads within chamber, L, said fabric passes downward between rolls, O, M'. From roll, M', the fabric passes to a roll, N, journaled in casing, P, thence to a similar roll, N', and thence up to rolls, M, O, and back to the filtering chamber, L. Motion is imparted to the rolls and the fabric, K, by any suitable means, and all finely divided desiccated material falling freely to the bottom of chamber, L, is carried by the motion of the fabric downward between rolls, O, M', and falls into a hopper, Q. The material is loosened from the fabric by a blast of air delivered from pipe, Q', and by the action of a rotary brush, R. For removing the material from hopper, Q, a screw conveyer, R', is located in the bottom portion of said hopper, and to this conveyer is discharged the material which is separated by precipitation in the centrifugal separator, said material being delivered from the central space of the separator through the outlet, $l$, and carried by a tube, $l^2$, to said conveyer, R'.

From the centrifugal separator, E, leads a wind trunk, E', adapted to form an outlet for the air and to convey any small particles of material back to the feed tank, F.

The mode of operation and advantages of the invention will be readily understood from the foregoing description taken in connection with the drawings.

Having thus fully described the invention, what I claim as new, and desire to secure by Letters Patent is:

1. In an apparatus for desiccating fluid substances, a desiccating chamber provided at its bottom with means for the free ingress of air, means connected with said chamber for establishing the upward flow of a current of air through said chamber, and a rotary liquid distributer positioned within the chamber substantially centrally thereof for showering the liquid directly into the upwardly flowing current of air.

2. In an apparatus for desiccating fluid substances, a desiccating chamber, an air heater forming a plurality of passages through which air is free to flow for the purpose of heating the same prior to its entry into the desiccating chamber, and a rotary distributer positioned within the chamber, substantially centrally thereof, for showering liquid material directly into the upwardly flowing current of air.

3. In an apparatus for desiccating fluid substances, a desiccating chamber, means for causing a current of air to circulate upwardly through said chamber, an air heater constituting a part of the bottom of said chamber, said air heater having means for the free flow of air through the same and directly into the desiccating chamber, and means for showering the liquid substance radially into the chamber.

4. In an apparatus for desiccating fluid substances, a desiccating chamber having means for the free ingress of a current of heated air directly into said chamber, a revoluble sprayer operatively positioned within the chamber, substantially centrally thereof, for showering a liquid substance within said chamber, and means whereby a current of air is caused to circulate through said chamber, said air current flowing through the chamber in a contrary direction to that of the liquid substance showered therein.

5. In an apparatus for desiccating fluid substances, a desiccating chamber having means for the free ingress of air thereto, a sprayer revoluble in a horizontal plane, said sprayer being positioned substantially centrally within said chamber, and means for causing a current of air to circulate through the chamber and directly in the path of the liquid material adapted to be distributed by said sprayer, whereby the liquid material is desiccated by the action of the air current flowing through the chamber and the resulting desiccated material is carried out of the chamber by said air current.

6. In an apparatus for desiccating fluid substances, a desiccating chamber open at its bottom for the free ingress of air, an air heater positioned within the open part of said chamber, said air heater having openings for the free flow of air therethrough, means for causing air to circulate upwardly through said heater and chamber, and means for distributing liquid material within said chamber and above the air heater.

7. In an apparatus for desiccating fluid substances, a desiccating chamber having an inlet at its bottom for air to enter said chamber freely, means for securing the circulation of an air current upwardly through said chamber, and a rotatable sprayer positioned substantially centrally within said chamber, whereby the air current acts to desiccate liquid material and to carry the resulting desiccated material out of said chamber.

8. In an apparatus for desiccating fluid substances, a desiccating chamber having an inlet whereby air freely enters said chamber, means for securing the circulation of an air current upwardly through said chamber, a rotatable sprayer positioned substantially centrally within said chamber, and means for supplying the liquid substance to be treated under pressure to said rotatable sprayer.

9. In an apparatus for desiccating fluid substances, a desiccating chamber, an air heater having openings through which air is adapted to flow into said desiccating chamber, means for inducing the flow of air through said heater and the chamber, and means for distributing a liquid material within the chamber, whereby the air current acts to desiccate the liquid material and to carry the resulting desiccated material out of said chamber.

10. In an apparatus for desiccating fluid substances, a desiccating chamber, an air heater positioned at the bottom of the desiccating chamber, said air heater being provided with spaces through which air is adapted to flow directly into the desiccating chamber, a suction fan or blower connected to said chamber whereby an air current is caused to circulate through the air heater and the chamber, and means for distributing liquid material within the chamber and above the air heater, whereby the liquid material is desiccated by the action of the air current, and the resulting desiccated material is carried out of the chamber by said air current.

In testimony whereof I have signed my name to this specification in the presence of two subscribing witnesses.

WILLIAM S. OSBORNE.

Witnesses:
H. I. BERNHARD,
M. C. POWELL.